(12) United States Patent
Guo et al.

(10) Patent No.: US 7,478,410 B2
(45) Date of Patent: Jan. 13, 2009

(54) TRANSMITTING MECHANISM OF INFORMATION RECORDING/REPRODUCING APPARATUS

(75) Inventors: Bin-Hai Guo, Shenzhen (CN); Chien-Ting Lo, Tu-Cheng (TW); Li-Ming Wan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 440 days.

(21) Appl. No.: 11/283,267

(22) Filed: Nov. 18, 2005

(65) Prior Publication Data

US 2006/0107277 A1    May 18, 2006

(30) Foreign Application Priority Data

Nov. 18, 2004    (CN) .................. 2004 2 0095591 U

(51) Int. Cl.
*G11B 7/085* (2006.01)
(52) U.S. Cl. .................................... 720/676
(58) Field of Classification Search ................ 720/676, 720/675, 663, 677
See application file for complete search history.

(56) References Cited

U.S. PATENT DOCUMENTS

| 4,041,793 | A | * | 8/1977 | Repay et al. ............. 74/424.95 |
|---|---|---|---|---|
| 4,333,116 | A | * | 6/1982 | Schoettle et al. .......... 360/78.02 |
| 4,528,607 | A | * | 7/1985 | Thompson ............... 360/267.4 |
| 4,667,524 | A | * | 5/1987 | Kozawa et al. ........... 74/424.75 |
| 5,150,260 | A | * | 9/1992 | Chigira ........................ 359/694 |
| 5,198,946 | A | * | 3/1993 | Kurosawa ................ 360/267.4 |
| 5,377,048 | A | * | 12/1994 | Tada et al. ................... 359/823 |
| 5,510,937 | A | * | 4/1996 | Mogamiya ................... 359/823 |
| 5,761,182 | A |  | 6/1998 | Jeon |
| 5,995,479 | A | * | 11/1999 | Takizawa et al. ............. 720/675 |
| 6,052,358 | A | * | 4/2000 | Morikawa et al. ........... 720/663 |
| 6,058,098 | A | * | 5/2000 | Kato ........................... 720/663 |
| 6,373,812 | B2 | * | 4/2002 | Kim et al. .................... 720/675 |
| 6,388,980 | B2 | * | 5/2002 | Otani et al. .................. 720/603 |
| 6,449,230 | B1 |  | 9/2002 | Seto |
| 6,577,585 | B2 | * | 6/2003 | Aoyama et al. .............. 369/255 |
| 6,636,473 | B1 | * | 10/2003 | Kagaya et al. ............... 720/683 |
| 6,741,542 | B2 | * | 5/2004 | Murotani ..................... 369/220 |
| 6,744,716 | B1 |  | 6/2004 | Takemoto |
| 7,216,354 | B2 | * | 5/2007 | Hermanns .................... 720/679 |
| 7,284,253 | B2 | * | 10/2007 | Youn et al. ................... 720/676 |
| 7,310,806 | B2 | * | 12/2007 | Kato et al. .................... 720/676 |
| 7,328,445 | B2 | * | 2/2008 | Park et al. .................... 720/676 |

* cited by examiner

*Primary Examiner*—Tianjie Chen

(57) ABSTRACT

A transmitting mechanism of an information recording/reproducing apparatus, includes a pickup carriage, two guide rods, a feeding screw, a feeding motor and an engaging member. The pickup carriage is movably supported by the guide rods. The feeding motor rotates the feeding screw. The engaging member includes a fixed portion and an engaging portion. The fixed portion is fastened on the pickup carriage, and the engaging portion engages with the feeding screw on a downside of the feeding screw (the downside thereof being determined relative to the operating position of the information recording/reproducing apparatus).

16 Claims, 4 Drawing Sheets

TRANSMITTING MECHANISM OF INFORMATION RECORDING/REPRODUCING APPARATUS

BACKGROUND OF THE INVENTION

1. Field of the Invention

The present invention relates to a transmitting mechanism of an information recording/reproducing apparatus and, more particularly, to a transmitting mechanism which prevents lubricant oil from potentially leaking out to stain the information recording/reproducing apparatus.

2. Description of Related Art

In recent years, optical recording media, hereinafter called optical discs, such as CDs (compact discs), DVDs (digital versatile discs) and HD-DVDs (high definition-digital versatile disc) have been developed to be capable of recording a large capacity of information at a high density. With the development of the optical discs, apparatuses that may record/reproduce information on/from the optical discs at high density with high accuracy are now available.

FIG. 4 (Prior Art) represents a conventional information recording/reproducing apparatus 100'. The optical disc (not shown) is mounted on a turntable 80 linked to a spindle motor 8 and is rotated thereby to cause optical beams emitted from an optical pickup unit 10 to be focused on a signal surface of the optical disc. The optical pickup unit 10 is guided by a transmitting mechanism 9, which is installed on a chassis 7. As such, the optical pickup unit 10 is configured for moving in radial directions of the optical disc. Thereby, the recording/reproducing operation of the optical disc system may be performed.

In detail, the transmitting mechanism 9 provides a pair of guide rods 91, a feeding screw 92, a feeding motor 93, and an engaging member 94. The guide rods 91 slidably support the optical pickup unit 10. The engaging member 94 has a fixed portion 940, an engaging portion 942 and a spring 944. The fixed portion 940 is secured with the pickup unit 10. The engaging portion 942 is substantially perpendicular to the chassis 7, on which the feeding motor 93 is installed. The spring 944 is located between the fixed portion 940 and the engaging portion 942. The spring 944 presses the engaging portion 942 into engagement with the feeding screw 92. The feeding motor 93 drives the pickup unit 10 via the feeding screw 92 and the engaging member 94 so that the pickup unit 10 selectably moves ahead and backward in relation to the optical disc.

However, when the feeding screw 42 is lubricated, the engaging portion 942 of the prior art can not prevent lubricant oil from leaking out to stain the information recording/reproducing apparatus 100'. Because it is substantially perpendicular to the chassis 7, there is no place for the engaging portion 942 to receive lubricant oil dropped from the feeding screw 92.

Accordingly, what is needed is a transmitting mechanism which prevents lubricant oil from potentially leaking out to stain the information recording/reproducing apparatus. What is also needed is an information recording/reproducing apparatus employing such a kind of transmitting mechanism.

SUMMARY

According to one embodiment of the present invention, a transmitting mechanism of an information recording/reproducing apparatus includes a pickup carriage, two guide rods, a feeding screw, a feeding motor and an engaging member. The pickup carriage is movably supported by the guide rods. The feeding motor rotates the feeding screw. The engaging member includes a fixed portion and an engaging portion. The fixed portion is secured with the pickup carriage, and the engaging portion engages with the feeding screw on the downside of the feeding screw.

BRIEF DESCRIPTION OF THE DRAWINGS

The above-mentioned and other features and advantages of this invention will become more apparent, and the invention will be better understood by reference to the following description of embodiments of the invention, taken in conjunction with the accompanying drawings, wherein.

Figure 1:
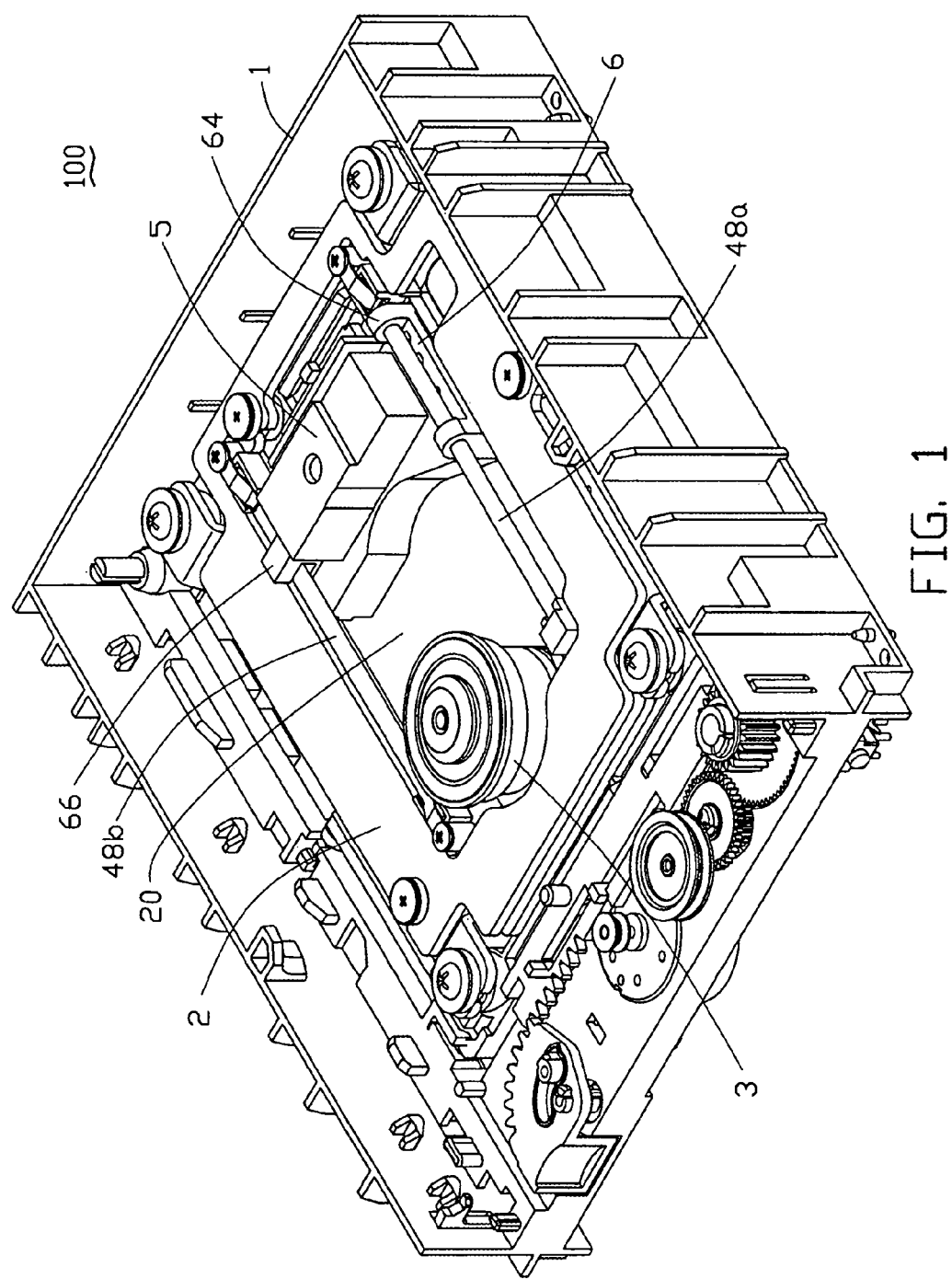
FIG. 1 is an isometric view of an information recording/reproducing apparatus and a transmitting mechanism thereof, in accordance with a preferred embodiment of the present invention.

Corresponding reference characters indicate corresponding parts throughout the several views. The exemplifications set out herein illustrate at least one preferred embodiment of the invention, in one form, and such exemplifications are not to be construed as limiting the scope of the invention in any manner.

DETAILED DESCRIPTION OF PREFERRED EMBODIMENTS

Reference will now be made to the drawing figures to describe, at least, the preferred embodiment of the present invention in detail.

Figure 2:
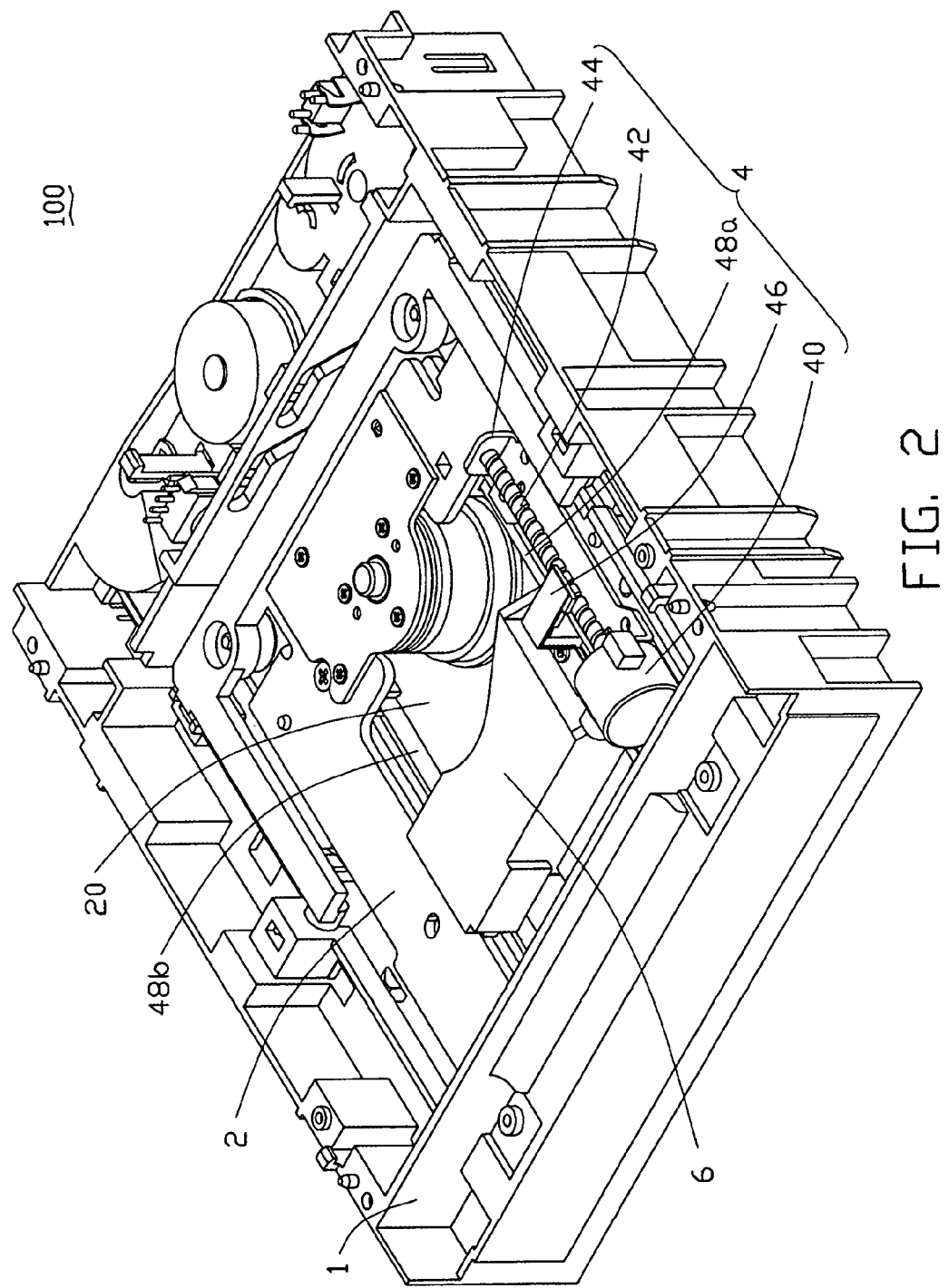
FIG. 2 is an isometric, bottom view of FIG. 1.

Referring to FIGS. 1 and 2, an information recording/reproducing apparatus 100 according to a preferred embodiment of the present invention is illustrated. The information recording/reproducing apparatus 100 includes a frame 1, a chassis 2, a spindle motor 3, a transmitting mechanism 4, a pickup 5, and a carriage 6. The chassis 2 has a center opening 20 therein and is received in the frame 1. The spindle motor 3 and the transmitting mechanism 4 are substantially installed on the underside of the chassis 2. The pickup 5 is located on the carriage 6. The carriage 6, which has two bearings 64 and an open-mode suspender 66, is supported and transmitted by the transmitting mechanism 4.

The transmitting mechanism 4 includes a feeding motor 40, a feeding screw 42, a fixed bolster 44, an engagement assembly 46, and first and second guide rods 48a, 48b. The fixed bolster 44 fixes the feeding motor 40 and the feeding screw 42 onto the underside of the chassis 2. The feeding screw 42 extends from and may be rotated by the feeding motor 40. The first and second guide rods 48a, 48b are mounted on the chassis 2, side by side, with all ends fastened by holders (not labeled). The first and second guide rods 48a, 48b are arranged adjacent to opposite sides of the center opening 20, respectively. The first guide rod 48a penetrates the bearings 64, and the second guide rod 48b penetrates the open-mode suspender 66, so that the carriage 6 is movably supported by the first and second guide rods 48a, 48b.

Figure 3:
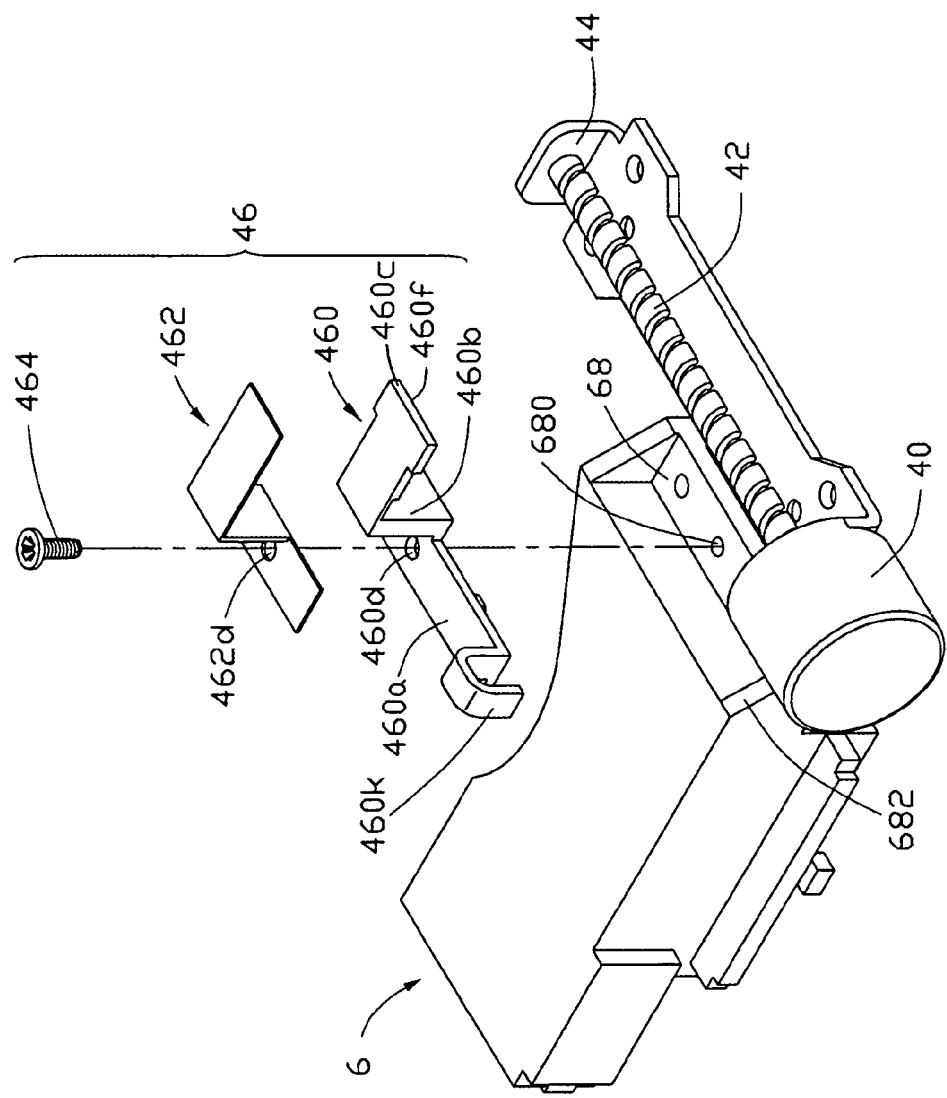
FIG. 3 is an enlarged, exploded, isometric view of part of the transmitting device of FIG. 1.
Figure 4:
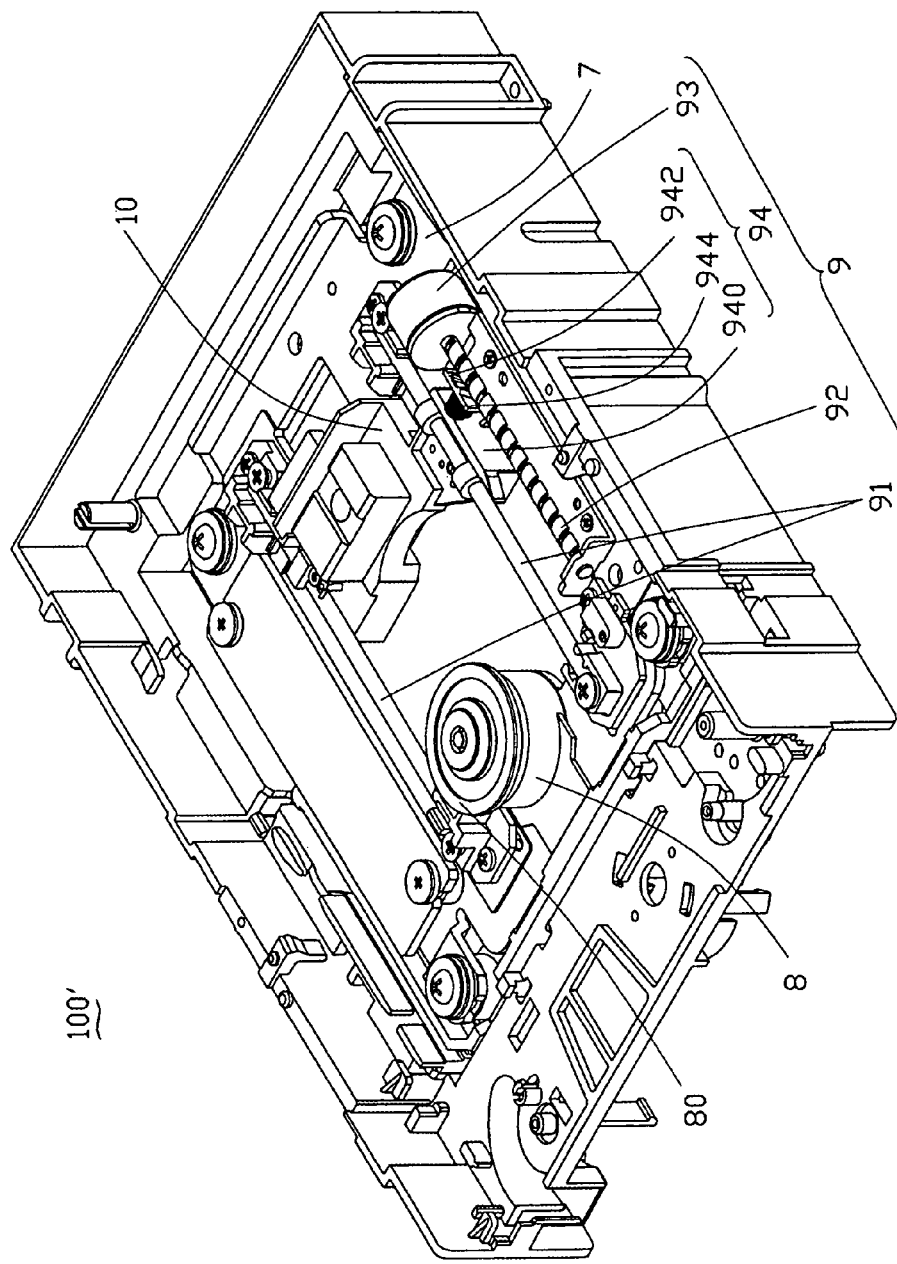
FIG. 4 is an isometric view of a conventional information recording and reproducing apparatus.

Referring also to FIG. 3, the engagement assembly 46, which is secured to a side of the carriage 6, includes an engaging member 460, a leaf spring 462 and at least one screw 464. The engaging member 460 forms a stepped style, such as a Z-shape, and advantageously is made of a synthetic resin having a low friction coefficient. The engaging member 460 includes a fixed portion 460a, a connecting portion 460b and an engaging portion 460c. The fixed portion 460a is substantially parallel to the engaging portion 460c. The connecting portion 460b connects the fixed portion 460a and the engaging portion 460c. The connecting portion 460b is perpendicular to at least one of the fixed portion 460a and the engaging portion 460c.

One end of the fixed portion 460a is provided with a hole 460d therein and forms a U-shaped hook 460k. Another end extends to form the connecting portion 460b. The engaging portion 460c, which is linked to the connecting portion 460b, faces the underside of the chassis 2. The engaging portion 460c has a retaining portion 460f, such as a surface facing the feeding screw 42. A plurality of tooth portions (not shown) is advantageously formed on the retaining portion 460f. The tooth portions engage with the helical grooves (not labeled) formed on the feeding screw 42. The leaf spring 462, which has a hole 462d therein, has a stepped shape, similar to the engaging member 460, and is formed through press molding of a thin metal spring material. The leaf spring 462 is mounted on the engaging member 460, and the holes 462d, 460d are corresponded to each other, with screw 464 inserted therethrough.

There is a receiving portion 68 on the underside of the carriage 6, located adjacent to feeding screw 42. The receiving portion 68 has at least one female screw 680 (i.e., a threaded hole) therein, and two sidewalls 682 formed at its opposite ends.

Referring also to FIGS. 2 and 3, the feeding motor 40 and feeding screw 42 are installed on the underside of the chassis 2 via the fixed bolster 44. The engagement assembly 46 is fastened on the receiving portion 68 with the screw 464 passing through the holes 462d, 460d and into the female screw 680. The hook 460k of the engaging member 460 strides/extends over one of the sidewalls 682. The engaging portion 460c is pressed upon by the leaf spring 462 and thereby engages with the feeding screw 42 in the opposite direction against the underside of the chassis 2.

During assembly, the feeding screw 42 is lubricated. The engagement assembly 46 is pushed along the guide rods 48a, 48b, so that the engaging portion 460c smears lubricant oil on the feeding screw 42 equally. The area of the engaging portion 460c connected to the downside of the feeding screw 42 is preferably large. This area is advantageously sufficiently sized so that drippings of lubricant oil are collected by the engaging portion 460c without leaking out to stain other elements of the information recording/reproducing apparatus 100.

In alternative embodiments, the carriage 6 is supported by edge of the chassis 2 directly via the open-mode suspender 66 instead of by guide rod 48b. The fixed portion 460a and the engaging portion 460c can also be coplanar instead of stepped in style. The leaf spring 462 would do likewise in such an instance. The engaging member 460 could also be integrally formed with the carriage 6.

Although the present invention has been described with reference to specific embodiments, it should be noted that the described embodiments are not necessarily exclusive. As such, various changes and modifications may be made to the described embodiments without departing from the scope of the invention as defined by the appended claims.

We claim:

1. A transmitting mechanism of an information recording/reproducing apparatus, comprising:
    a pickup carriage;
    two guide rods, the pickup carriage being movably supported by the guide rods;
    a feeding screw having an upside and a downside, the upside and the downside of the feeding screw being determined relative to an operational state of the information recording/reproducing apparatus;
    a feeding motor configured for rotating the feeding screw;
    an engaging member including a fixed portion and an engaging portion, the fixed portion being fixed on the pickup carriage, the engaging portion engaging with the feeding screw on the downside of the feeding screw; and
    a leaf spring comprising a fixed end being fixed on the pickup carriage along with the fixed portion of the engaging member, and a free end pressing the engaging portion of the engaging member towards the upside of the feeding screw.

2. The transmitting mechanism as described in claim 1, wherein the engaging member further comprises a connecting portion, the fixed portion connecting the engaging portion via the connecting portion.

3. The transmitting mechanism as described in claim 2, wherein the engaging portion is parallel to the fixed portion.

4. The transmitting mechanism as described in claim 2, wherein the connecting portion is perpendicular to at least one of the engaging portion and the fixed portion.

5. The transmitting mechanism as described in claim 1, wherein the pickup carriage comprises a receiving portion, the fixed portion being installed on the receiving portion.

6. The transmitting mechanism as described in claim 1, wherein the engaging portion comprises a retaining portion configured for receiving a lubricant oil from the feeding screw.

7. The transmitting mechanism as described in claim 6, wherein the retaining portion contacts the feeding screw and is thereby configured for smearing the lubricant oil on the feeding screw.

8. The transmitting mechanism as described in claim 6, wherein the retaining portion is a surface facing the feeding screw.

9. The transmitting mechanism as described in claim 1, wherein the leaf spring is essentially Z-shaped.

10. An information recording/reproducing apparatus, comprising:
    a chassis;
    a pickup mounted on the chassis, the pickup being configured for selectably emitting and receiving light beams to/from a media;
    a spindle motor mounted on the chassis, the spindle motor being configured for rotating a disc thereon; and
    a transmitting mechanism for transmitting the pickup comprising:
        a pickup carriage configured for receiving the pickup;
        at least one guide rod, the pickup carriage being movably supported by the guide rod;
        a feeding screw having an upside and a downside, the upside and the downside of the feeding screw being determined relative to an operational state of the information recording/reproducing apparatus;
        a feeding motor configured for rotating the feeding screw;
        an engaging member including a fixed portion and an engaging portion, the fixed portion being fixed on the pickup carriage, the engaging portion engaging with the feeding screw on the downside of the feeding screw; and
        a leaf spring comprising a fixed end being on the pickup carriage along with the fixed portion of the engaging member, and a free end pressing the engaging portion of the engaging member towards the upside of the feeding screw.

11. The information recording/reproducing apparatus as described in claim 10, wherein the engaging member further comprises a connecting portion, the fixed portion connecting the engaging portion via the connecting portion.

12. The information recording/reproducing apparatus as described in claim 10, wherein the engaging portion is parallel to the fixed portion.

13. The information recording/reproducing apparatus as described in claim 10, wherein the pickup carriage comprises a receiving portion, the fixed portion being installed on the receiving portion.

14. The information recording/reproducing apparatus as described in claim 10, wherein the engaging portion comprises a retaining portion configured for receiving a lubricant oil from the feeding screw.

15. The information recording/reproducing apparatus as described in claim 14, wherein the retaining portion contacts the feeding screw and is thereby configured for smearing the lubricant oil on the feeding screw.

16. The information recording/reproducing apparatus as described in claim 10, wherein the leaf spring is essentially Z-shaped.

* * * * *